Dec. 2, 1947.  T. A. CUTTING  2,431,734
ADJUSTABLE FOLDING SPECTROSCOPE
Filed April 24, 1944
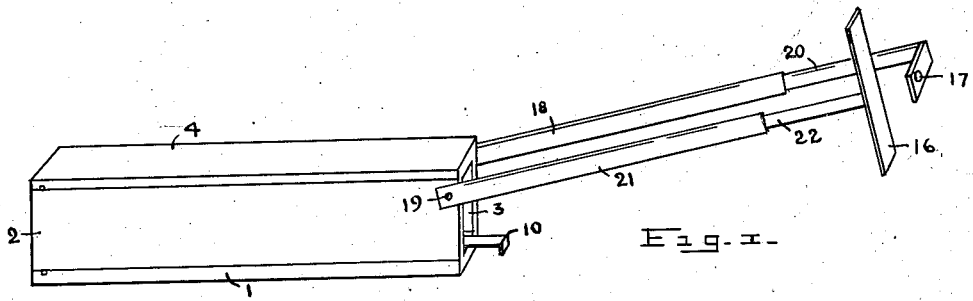
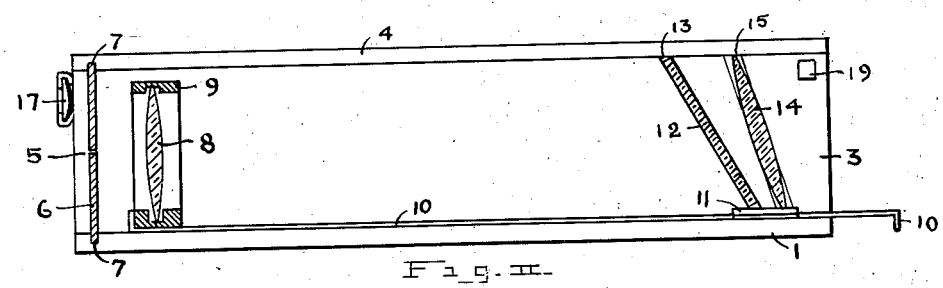
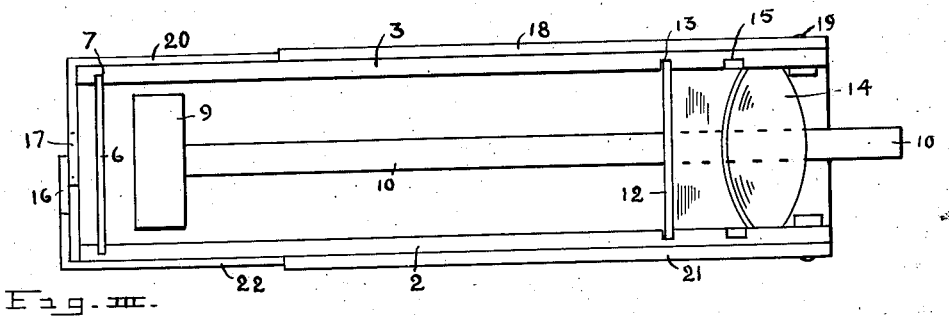
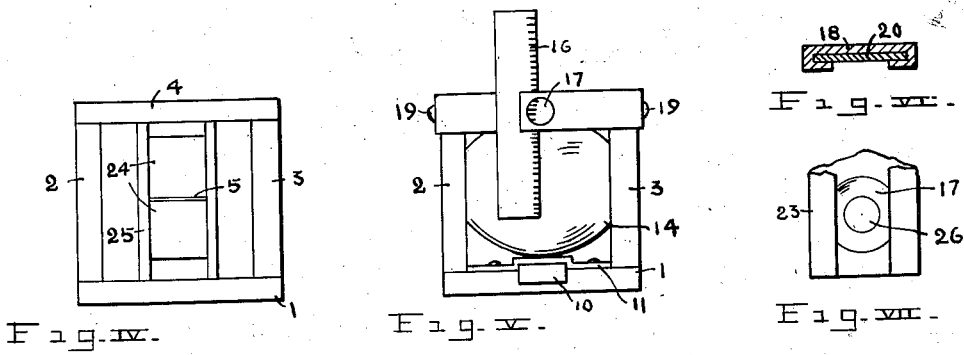
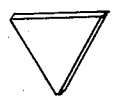
INVENTOR
Theodore A. Cutting Patented Dec. 2, 1947

2,431,734

UNITED STATES PATENT OFFICE 2,431,734

ADJUSTABLE FOLDING SPECTROSCOPE

Theodore A. Cutting, Campbell, Calif.

Application April 24, 1944, Serial No. 532,521

9 Claims. (Cl. 88—14)

My invention relates to improvements in spectroscopes and the object of my improvement is to provide a compact, highly adjustable spectroscope with a wave-length scale and means for adjusting the instrument to the scale so that its readings will be accurate. A further object is to provide means for regulating the magnification of the instrument so that the spectrum may be made to fit any one of several scales of different lengths. Still further objects are to provide means for the prevention of parallax and means for folding the very powerful instrument into a very small space for shipping or storing. My instrument is direct reading, without parallax, and very accurate. Other objects will appear from the following description and the drawings, in which:

Figure I is a perspective view of the spectroscope extended for use; Fig. II a side view, showing the spectroscope folded and with one side removed and certain parts in section; Fig. III a top view, with cover removed; Fig. IV a back end view; Fig. V a front end view; Fig. VI a cross section of a slide in its sheath; Fig. VII a rear view of the ocular; and Fig. VIII an end view of a prism, an optional means of dispersion.

The case of the spectroscope consists of a base 1, sides 2, 3 and a top 4. Closing one end is the plate 6 containing the slit 5. The light to be analyzed, usually from chemicals burning in an electric arc, enters the narrow horizontal slit 5 in the end plate 6, held in place by the grooves 7 in the top, sides and base. All light from the arc, except that entering the slit, is thus excluded.

After entering the slit, the beam of light passes through the lens 8, held upright by the grooved member 9, mounted upon the slide 10. The slide runs through the whole length of the spectroscope, passes beneath the strip 11, and projects beyond the end of the instrument. By this means the lens 8 may be slid back and forth to any desired position in the case.

The beam of light then passes on through the diffraction grating 12, held in an oblique position by grooves 13 in the sides 2, 3, and supported at the bottom by the strip 11 which prevents contact with slide 10. The grating 12 turns part of the beam of light upward through the telescopic objective lens 14, also set obliquely in the case, although at a lesser angle than the grating 12. The lens 14 is held in position by grooves 15 in the sides, and is also supported by the strip 11.

Finally the light beam, now separated into its different colors, passes upwardly past the scale 16 and through the eye lens 17 to the eye of the observer. The eye lens is held at the end of an adjustable arm consisting of a sheath 18, rotatively attached to the case by the bolt 19, and a slide 20 fitting slidably within the sheath. The scale 16 is likewise at the free end of an arm consisting of a sheath 21, also bolted to the case, and a slide 22, which may be pulled from the sheath as far as desired. The slide 20 may be a flattened sheath, bent toward the end at a 90° angle and holding the edges of the eye lens 17 in its folds 23, as shown in Fig. VII. The lens 17 is placed over hole 26 in the slide 20. The slit may consist of a fixed opening, as shown in Fig. II, or it may be of adjustable width, as shown in Fig. IV in which the slit is formed by two slides 24 held somewhat snugly by a sheath 25 folded in the same manner as the arm sheath illustrated in Fig. VI.

In operation: the ocular 17 is raised to the field of colored light thrown upwardly by the grating 12 and the lens 14. The lens 8 is then drawn forward by means of the sliding strip 10, which projects conveniently from the front of the instrument, until the colored spectral lines appear sharp and clear. The scale 16 is then interposed between the ocular 17 and the objective lens 14 so that the horizontal lines of the scale and the horizontal lines of the spectrum appear adjacent and alongside each other, and so that the scale is in the focus of the ocular lens.

The bolt 19 permits rotation of the scale arm, and so the scale is adjusted to the yellow sodium doublet. Other known lines are then tested, as for instance, the red lithium line near 6700 and the blue one at 4600. If these red and blue lines fall outside the indicated scale positions, the lens 8 is pulled forward. This tends to make the light rays less divergent and to decrease the magnification of the spectrum. When the spectrum exactly coincides with the scale, the instrument is ready for use. If, on the other hand, the red and blue lithium lines should lie within the indicated scale positions, the lens 8 would, of course, have to be pushed back to make the light rays diverge more and so increase magnification.

For shipment, or for storage when not in use, both the lens and scale arms are folded back along the sides of the instrument, and with ocular and scale at the rear as shown in Figs. II and III. Preferably both short and long scales are furnished with the same instrument. The spectrum may then be given greater or less magnification according to whether greater accuracy or greater brilliance is desired, for with the longer scale more accurate wavelength readings may be made, and with the shorter, more brilliant spectrum, more of the faint spectral lines will be rendered visible.

The grating 12 and the lens 14 are arranged on a slant to make unnecessary the pushing in and pulling out of the ocular as it sweeps up and down in the spectral field. If the grating were perpendicular, it would be necessary to pull the ocular out in its slide as well as to lower it to bring out clearly the violet spectral lines at the bottom of the spectrum, and then to push it in again upon returning to the red lines at the top. But with a 15,000-line grating at an angle of about 60° this pushing and pulling is avoided.

Other spectroscopes place the telescope objective 14 upon the moveable portion of the instrument along with the ocular 17. This causes bothersome parallax in reading the wavelengths, which I avoid by mounting the lens rigidly in the case and tilting it at right angles to the general path of light between the grating 12 and the ocular 17. The usual arrangement is to have the scale entirely separate form the telescope instead of within it and simultaneously visible with the spectrum. My arrangement is much more advantageous since the wavelengths are read positively and instantly, so that it is possible to read off the elements present in a rock sample almost as readily as from a printed list. In the grating spectroscope the lens 8 is not indispensable in producing a spectrum, but is very useful in determining the degree of magnification. With modified spacing of lenses, diffraction gratings and prisms are interchangeable means of dispersion. In my arrangement the prism should be inverted as shown in Fig. VIII.

I claim:

1. A spectroscope having a case, a slit at the back of said case for admitting a flattened beam of light, a strip mounted for sliding movement along the bottom of said case with one end projecting from the front of the case for convenience of manipulation, an upright lens attached to the inner end of said strip and slidable with it and receiving the flattened beam, said lens governing by its relative distance from said slit the magnification of the spectrum, a diffraction grating toward the front end of said case inclined from the vertical with its top back toward the slit to produce a spectrum thrown upwardly at an angle, a telescope for viewing the spectrum, comprising an objective fixed in the front end of said case and also inclined from the vertical but to a less extent than said grating so as to be perpendicular to the general path of the spectrum, and an ocular, and an arm pivotally attached at one end to the case for rotation about an axis parallel to the slit and from an operative position in front of the case to an inoperative position against the side of the case, said arm comprising two elements relatively slidable lengthwise of the arm for varying the length thereof with the ocular mounted on the free end of the outer element.

2. A spectroscope having a case, a slit at one end of said case, a lens mounted in said case for sliding movement toward and away from the slit, receiving the flattened beam of light from said slit, said lens determining by its distance from the slit the magnification of the spectrum, means for sliding said lens toward or away from said slit, a diffraction grating athwart the case receiving the light from said lens, an objective lens beyond said grating athwart said case receiving the dispersed light from said grating, an ocular beyond said objective for viewing the spectrum, means attached to said case supporting said ocular for focusing movement, and means attached to said case for detachably supporting for focusing movement any one of a plurality of scales alongside the spectrum and between said ocular and said case for measuring the spectra of different magnifications as governed by said slidable lens.

3. A spectroscope having a case, a slit at the back of said case for admitting a narrow beam of light, a strip mounted for sliding movement along the bottom of said case with one end projecting from the front of the case for manipulation, an upright lens attached to the inner end of said strip and slidable with it and receiving the beam of light, said lens governing the magnification of the spectrum by its position, a diffraction grating toward the front of said case tilted back at an angle from the vertical, receiving the beam of light and dispersing it as a spectrum, an objective lens at the front of the case receiving the beam from the grating and also inclined from the vertical, an ocular lens beyond said objective lens for viewing the spectrum, means attached to said case supporting said ocular for focusing movement, a scale between said objective and ocular lenses for measuring the spectrum, and means attached to said case supporting said scale for focusing movement.

4. A spectroscope having a case, means within said case for producing a spectrum, an ocular for viewing said spectrum, an arm pivotally attached at one end to the case for rotation about an axis parallel to the lines of the spectrum issuing from the case and from an operative position in front of the case to an inoperative position against the side of the case, said arm comprising a sheath and a rod slidable lengthwise therein with the ocular mounted on the free end of the rod.

5. A spectroscope having a case, means within said case for projecting therefrom a spectrum, parallel sheaths pivotally attached to said case on opposite sides thereof and on opposite sides of the spectrum for rotation about axes parallel with the lines of the spectrum, arms sliding longitudinally in said sheaths, right angle terminations for both of said arms extending toward the spectrum, an ocular lens attached to one of said terminations for viewing the spectrum, and a wavelength scale attached to the other of said terminations and positioned between the ocular lens and the case.

6. A spectroscope having a case, a slit at the back of said case, an objective lens athwart the front of said case, a diffraction grating between said slit and said objective lens and mounted in said case athwart the case near said objective lens, a lens mounted in said case for sliding movement between said slit and said grating and determining by its position the magnification of the spectrum produced by said slit, lenses, and grating, means for sliding the slidable lens back and forth between slit and grating, an ocular lens beyond said objective for viewing the spectrum issuing from said objective lens, means attached to said case for supporting said ocular lens for focusing movement, a wavelength scale between said ocular and objective lenses and alongside the spectrum for measuring it, and means attached to said case for supporting said scale.

7. A spectroscope having a case, means for dispersing light into its component colors at one end of said case, a slit at the opposite end of said case, a convex lens between said slit and said dispersing means, means for adjusting the distance between said convex lens and said slit, and so determining the magnification of the spectrum, a telescope for viewing the spectrum comprising a fixed objective mounted athwart the end of the case near said dispersing means, and an ocular spaced from said objective, a supporting member for said ocular comprising two members in slidable engagement for longitudinal extension, one of them pivotally attached to said case and rotating on an axis parallel to said slit and the other carrying at the free end said ocular, a scale for measuring the spectrum produced when said convex lens is in a predetermined position, and means attached to said case for supporting said scale between said ocular and said fixed objective so as to be viewed alongside the spectrum.

8. A spectroscope having a case, vertical grooves in the side walls of said case near the back, an opaque partition fitting athwart the case in said grooves, a slit in said partition, a pair of oblique grooves in the side walls of the case near the front, a diffraction grating placed athwart the case with edges held in said oblique grooves, a second pair of oblique grooves in the side walls of said case closer to the front of the case than said first oblique pair, a convex objective lens having its edges held in the second pair of oblique grooves, a sleeve beneath both said grating and said objective lens attached to the bottom of the case, a metal strip passing slidably through said sleeve, a holder attached to the end of said strip, and slidable therewith, a convex lens held upright in said holder receiving a beam of light from said slit and passing it on to said grating and determining by its position the magnification of the spectrum issuing from said grating and objective lens, an ocular spaced from said objective lens for viewing the spectrum, means supporting said ocular, a scale between said ocular and said objective lens for measuring the spectrum, and means for supporting said scale.

9. A spectroscope having a tubular casing, a slit, a regulating lens, a diffraction grating and an objective lens arranged consecutively therein, means for sliding said regulating lens to and fro between said slit and said grating to control the magnification of the spectrum produced by said slit, grating and lenses, means for holding said slit, grating and objective lenses in fixed relation, a scale for measuring the spectrum produced by said slit, grating and lenses spaced from said objective lens, means attached to said casing for supporting said scale in a fixed position alongside the spectrum, an ocular beyond said scale for simultaneously viewing both the spectrum and the scale, and means attached to the case for supporting the ocular.

THEODORE A. CUTTING.

REFERENCES CITED

The following references are of record in the file of this patent:

UNITED STATES PATENTS

| Number | Name | Date |
| --- | --- | --- |
| 2,282,643 | Cutting | May 12, 1942 |

FOREIGN PATENTS

| Number | Country | Date |
| --- | --- | --- |
| 128,104 | Germany | Feb. 8, 1902 |
| 10,200 | Great Britain | Series of 1911 |